(12) United States Patent
Slama

(10) Patent No.: US 6,665,799 B1
(45) Date of Patent: Dec. 16, 2003

(54) METHOD AND COMPUTER SOFTWARE CODE FOR PROVIDING SECURITY FOR A COMPUTER SOFTWARE PROGRAM

(75) Inventor: Jeffery E. Slama, Joplin, MO (US)

(73) Assignee: DVI Acquisition Corp., Marlton, NJ (US)

( * ) Notice: Subject to any disclaimer, the term of this patent is extended or adjusted under 35 U.S.C. 154(b) by 0 days.

(21) Appl. No.: 09/301,522

(22) Filed: Apr. 28, 1999

(51) Int. Cl.$^7$ .......................... G06F 11/30; H04M 11/00; H04L 9/00

(52) U.S. Cl. .......................... 713/201; 713/202; 705/54; 379/93.02

(58) Field of Search ................................ 713/200, 201, 713/202, 189; 380/25; 705/54; 379/93.02

(56) References Cited

U.S. PATENT DOCUMENTS

| | | | |
|---|---|---|---|
| 4,446,519 A | | 5/1984 | Thomas ..................... 364/300 |
| 4,959,861 A | | 9/1990 | Howlette ..................... 380/4 |
| 5,267,311 A | | 11/1993 | Bakhoum ..................... 380/4 |
| 5,377,269 A | | 12/1994 | Heptig et al. ................. 380/25 |
| 5,537,436 A | * | 7/1996 | Bottoms et al. ............. 375/222 |
| 5,900,867 A | * | 5/1999 | Schinder et al. ............. 345/327 |
| 6,314,409 B2 | * | 11/2001 | Schneck et al. .............. 705/54 |

OTHER PUBLICATIONS

UHER: Digital Voice Management System, DP 10, Interface—Adapter, User Instructions; pp. 1–22.

UHER: Digital Voice Management System, ComDict, Software for digital speech processing, Installation and User Handbook; pp. 1–43.

* cited by examiner

Primary Examiner—Norman M. Wright
(74) Attorney, Agent, or Firm—Fulbright & Jaworski L.L.P

(57) ABSTRACT

A method and computer software code for monitoring security codes generated by a security device and providing software security for an application program are disclosed. In a preferred embodiment, security software provides security for an application program by reading analog data signals representing a security code from a predetermined input port of a computer, determining whether the read analog data signals correspond with an expected security code, and enabling or disabling the protected application program based upon whether the read analog data signals correspond with an expected security code. In a preferred embodiment, the analog data signals are resistance values, and the predetermined input port of a computer is a game port. In a preferred embodiment, multiple sequences of resistance values, a combination of which form a security code sequence, are presented to the analog pins of a computer's game port. Security software reads the security code sequences and either enables or disables the protected application program based upon whether the read security code sequence corresponds to an expected security code sequence. In a preferred embodiment, the security software is capable of compensating for execution delays caused by a non-real-time operating system. Also, in a preferred embodiment, the security software is capable of compensating for the analog data being presented to the input port of a computer asynchronous to the security software reading such analog data.

54 Claims, 6 Drawing Sheets

| STATE | PIN 6 (CHANNEL Y) | PIN 3 (CHANNEL X) | PIN 11 (CHANNEL R) |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |
*FIG. 3*
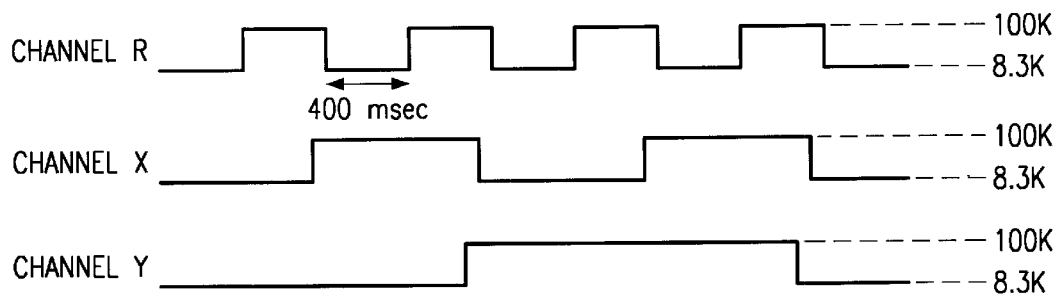
*FIG. 4*
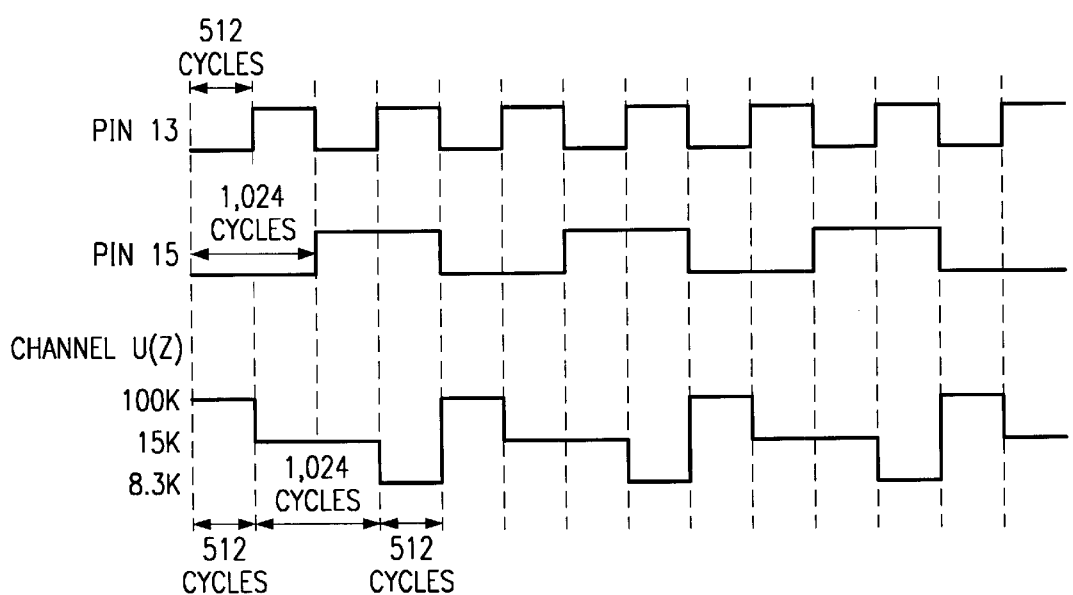
*FIG. 5*

METHOD AND COMPUTER SOFTWARE CODE FOR PROVIDING SECURITY FOR A COMPUTER SOFTWARE PROGRAM

RELATED APPLICATION

This application is related to concurrently filed and commonly assigned U.S. application Ser. No. 09/301,523 entitled "A Device and Method for Providing Security for a Computer Software Program," the disclosure of which is hereby incorporated herein by reference.

TECHNICAL FIELD

This invention relates to software security and more specifically to a method and computer software code for providing security for a computer software program.

BACKGROUND

Once software is distributed to purchasers it is relatively easy for the purchasers to make unlimited copies and distribute them as they desire. As a result of such copying, substantial revenues have been lost. In fact, a recent study by Business Software Alliances (BSA) and the Software Publishers Association (SPA) estimated revenue losses to the worldwide software industry due to piracy at $11.4 billion. (Report available at http://www.spa.org/piracy/releases/97pir.htm). The study estimates that, of the 574 million new business software applications installed globally during 1997, 228 million applications (or four in every ten) were pirated. This represents an increase of two million more new applications being pirated than in the previous year 1996. The U.S. was reported as the country with the highest dollar losses due to software piracy followed by China, Japan, Korea, Germany, France, Brazil, Italy, Canada, and the United Kingdom. The piracy rate for the U.S. alone was estimated at 26% for 1995, and 27% for 1996 and 1997. Accordingly, revenue losses to the software industry due to piracy in the U.S. were estimated at $2,940,294 in 1995, $2,360,934 in 1996, and $2,779,673 in 1997.

With such an increasing amount of revenue being lost to software piracy, it is becoming ever-increasingly important for software developers to protect their software applications against unauthorized copying and/or use. In the prior art, several techniques have been developed in attempts to prevent software piracy. Such techniques include: security systems integrated with the software application program, and systems with certain external attachments (i.e., "dongles") that interact with the application program.

Software security solutions have been developed, which attempt to provide security for a computer application program solely through software. Such "software only" solutions do not require any additional hardware to perform security measures. Such software solutions typically utilize a registration database and encryption technology to provide security for an application program. That is, such security software solution typically checks the registration for an application program against a registration database to determine if use of the program is authorized. Typically, a registration is contained in the database only for application programs that have been purchased, and a registration is not contained for unauthorized copies of such application program. Therefore, such a software solution attempts to provide security by only allowing application programs that have a registration in the database to operate.

Security systems have also been developed which utilize external attachments called "dongles." Dongles have been developed to interface with the parallel printer port of a personal computer (PC). Dongles have also been developed to interface with the serial port of a PC. Additionally, dongles have been developed to interface with the USB port of a personal computer. Other interfaces for which dongles have been developed include: the 36-pin Centronic interface for Japanese NEC-PC98xx systems and for standard PCs, and the ADB bus of the Apple Macintosh.

The general operation of a dongle is as follows: each dongle contains a unique code that is recognized by the protected software. During runtime, the protected program checks whether a dongle with the appropriate code is connected to the computer's port (such as the parallel printer port). If the dongle's code is confirmed, the software is executed. If not, the software will not run.

More specifically, most dongles contain an ASIC (Application Specific Integrated Circuit) chip with multiple electronic algorithms. During runtime, the protected software sends queries to the dongle connected to the designated port of the computer. The dongle evaluates each query and responds. If the response returned by the dongle is correct, the software is allowed to run, otherwise the software is not allowed to proceed as desired. If the correct response is not returned the software developer may be allowed to decide how the software should react, such as preventing the application from running or switching to a demo mode. Therefore, software developers may require that users connect a dongle to one of the above-described ports prior to running the corresponding software program. In this manner, software developers can utilize the above-described dongles to protect their software applications.

SUMMARY OF THE INVENTION

Several problems exist with prior art systems for providing security for software applications. Particularly where the security system resides solely in the software program, it has become relatively easy to break the code used in protecting an application program. In fact, there have been marketed other programs solely for the purposes of breaking such codes. That is, software programs. have been developed that enable buyers to duplicate protective software and avoid any internal security measures. Once the code is voided or broken, the user can then recopy the program and distribute it through computer networks to literally thousands of other unauthorized users. Furthermore, because security systems that reside solely in the program often do not allow users the ability to copy the program at all, users do not have the luxury of being able to make back-up copies of the program.

Problems also exist for the prior art dongles utilized for software application security. Dongles that connect to the parallel or serial ports are inconvenient for most users because their parallel and/or serial ports already interface with other devices, such as a mouse, an external modem, or a printer. Thus, many users are hesitant to dedicate such ports to a security device. Some parallel port dongles claim to have "pass through" capabilities. Such pass through capabilities require that the dongle be connected to the port and then another device, such as a printer, can be connected to the dongle. Such a dongle is suppose to utilize the port to provide security and also allow signals to pass through to the other device. In effect, such dongles attempt to "share" the port with another device. However, when utilized with preemptive operating environments, such as Microsoft Windows 95, 98 and NT, potential problems with sharing ports exist. For example, a dongle may preempt a printer or other device attempting to utilize the same port such that the dongle may effectively take over the port solely for its operation for extended periods of time. By the same token a printer or other device attempting to utilize the same port with a dongle may preempt the dongle, such that the printer or other device may effectively take over the port solely for its operation for extended periods of time.

An additional problem associated with the dongles currently available is that users are aware that the software provider is requiring them to install a security device before they are allowed access to a particular program. Many users do not appreciate the inference that they are not trustworthy, and users may even forgo purchasing the software product.

Yet another problem with the dongles currently available is that most users do not like the extra effort required on their part to attach a dongle to one of the above-described ports. In this sense, even dongles that have pass-through capabilities require the user to disconnect a device that was previously interfacing with a particular port, connect the dongle to that port, and then connect the original device to the dongle. In turn, this required effort on the part of the user makes a developer's software application less appealing to consumers.

Thus, there is a desire to provide security for software developers. There is a further desire for security software capable of receiving analog data representing a security code from an input port of a computer and enabling or disabling a protected application program based upon whether the received analog data corresponds to an expected security code. There is a further desire for such security software to be capable of executing in a non-real-time operating system to provide security for an application program. There is yet a further desire for such security software to be capable of reading analog data that is presented to an input port of a computer asynchronous to the execution of the security software to provide security for an application program.

These and other objects, features and technical advantages are achieved by a method and computer software code which provide software security by reading analog data signals representing a security code from a predetermined input port of a computer, determining whether the read security code corresponds with an expected security code, and enabling or disabling the protected application program based upon whether the read security code corresponds with an expected security code. In a preferred embodiment, the analog data signals are resistance values, and the predetermined input port of a computer is a game port. Thus, in a preferred embodiment the security software is capable of reading resistance values representing a security code from the game port of a computer, determining whether the read resistance values correspond with an expected security code, and enabling or disabling the protected application program based upon whether the read resistance values correspond with an expected security code.

As used herein, the term "security" means preventing unauthorized operation of all or a portion of a software program. In a preferred embodiment of the invention, security for an application program is provided by presenting multiple sequences of resistance values, which represent a security code sequence, to the analog pins of the game port of a computer. Security software executing on the computer may utilize the computer's sound card to read the security code sequences presented to the analog pins of the game port. If the security code sequences read by the security software correspond with an expected security code, the application program may be enabled and allowed to operate correctly. However, if the security code sequences read by the security software do not correspond with an expected security code, the application program may be disabled and not allowed to operate correctly. For example, if the application program is disabled, all or a portion of the application program may not function, the application program may be presented in a demo mode, or the application program may vary in some other way from its normal operation.

In a preferred embodiment, the security software is capable of compensating for execution delays caused by a non-real-time operating system. In such a non-real-time operating system, the execution of reading a security code from an input port of a computer may be delayed. However, the generation of such security code may not be delayed. Thus, delays caused by a non-real-time operating system may permit the security code presented to an input port of a computer to advance to a new code within a sequence of codes before the security software is capable of reading the security code. A preferred embodiment of the security software is capable of compensating for such execution delays such that the security software may provide software security for a protected application in a reliable manner.

In a preferred embodiment, the security software is capable of compensating for the analog data being presented to the input port of a computer asynchronous to the security software reading the analog data. Because the analog data may be presented to the input port of a computer asynchronous to the security software performing a read of the analog data, the security software may perform a read of the analog data at a time when one or more of the analog data signals are in the process of changing from one state to another state. Thus, the security software may perform a read of the analog data at a time when one or more the analog data signals are at an in-between state. A preferred embodiment of the security software is capable of compensating for the analog data being presented to the input port of a computer asynchronous to the security software reading the analog data such that the security software may provide software security for a protected application in a reliable manner.

It should be appreciated that a technical advantage of the present invention is that a method and computer software code which provide software security for an application program is provided. A further technical advantage is realized in that a preferred embodiment is capable of reading analog data representing a security code from an input port of a computer and determining whether the read security code corresponds with an expected security code. A further technical advantage is realized in that a preferred embodiment is capable of enabling or disabling a protected application program based upon whether the read security code corresponds with an expected security code.

Yet a further technical advantage is realized in that a preferred embodiment is capable of compensating for execution delays in reading a security code from an input port of a computer caused by a non-real-time operating system. Still a further technical advantage is realized in that a preferred embodiment is capable of compensating for a security code being presented to an input port of a computer asynchronous to the security software reading the security code.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 3 shows a logic diagram for an exemplary code sequence generated by the security circuitry in a preferred embodiment;

FIG. 4 shows a wave trace illustrating an exemplary code sequence generated by the security circuitry in a preferred embodiment;

FIG. 5 shows an exemplary wave trace illustrating a confounding signal presented to channel U(Z) in a preferred embodiment of the security circuitry;

DETAILED DESCRIPTION

A method, system and apparatus for providing security for an application program by generating analog data signals representing security codes and inputting such analog data signals to an input port of a computer is disclosed. Additionally, a method and computer software code for providing security for an application program by reading analog data signals representing security codes and enabling or disabling such application program based upon whether such read security codes correspond with an expected security code is disclosed.

Figure 1:
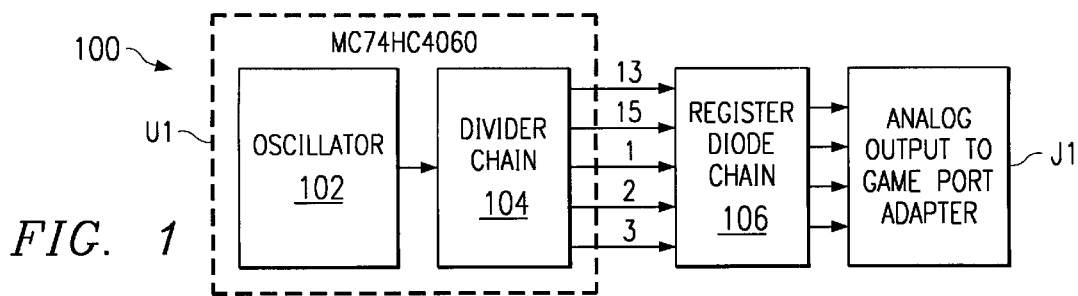
FIG. 1 shows a block diagram of a preferred embodiment of the security circuitry used to prevent unauthorized use of a software program.
Figure 2:
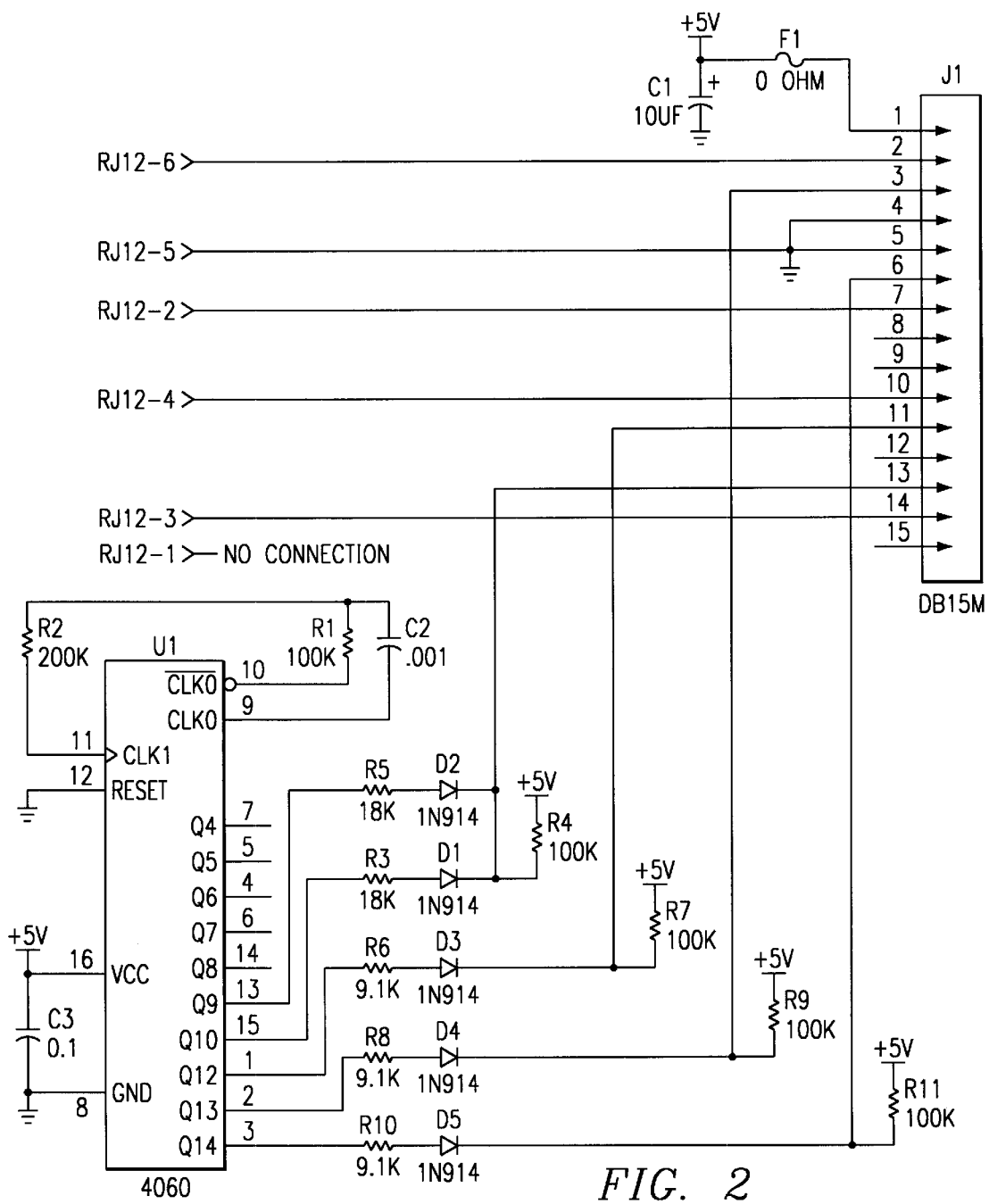
FIG. 2 shows a detailed diagram of a preferred embodiment of the security circuitry used to prevent unauthorized use of a software program.

In a preferred embodiment, security for an application program is provided by presenting sequences of resistance values (or resistance levels) to analog pins of the game port of a computer. A preferred embodiment of circuitry implemented to provide such security for an application program is illustrated in FIGS. 1–2. Turning to FIG. 1, a block diagram of a preferred embodiment of the security circuitry 100 is shown. As illustrated, security circuitry 100 contains an oscillator 102 that generates a frequency signal, which is input to a divider chain 104. Divider chain 104 divides the frequency signal supplied by oscillator 102 into multiple frequency signals. In a preferred embodiment, 5 different frequency signals are output by the divider chain 104 to a resistor diode chain 106. A single integrated circuit, such as chip U1, may be utilized to provide one or more of the component parts of security circuitry 100. In a preferred embodiment, chip U1 is a MC74HC4060 that provides oscillator 102 and divider chain 104. It should be understood, however, that the security circuitry may be accomplished without utilizing an integrated circuit or by utilizing different integrated circuit(s), and any such implementations are intended to be within the scope of the present invention.

In a preferred embodiment, frequency signals output by the divider chain 104 on pins 13, 15, 1, 2, and 3 of chip U1 are fed into a resistor diode chain 106. Thus, divider chain 104 creates multiple frequency signals (e.g., 5 frequency signals) that are each fed to resistor diode chain 106. Resistor diode chain 106 converts the multiple frequency signals into multiple sequences of resistance values (e.g., 4 separate resistance value sequences). That is, the resistor diode chain 106 creates sequences of resistance values according to the frequency supplied to the resistor diode chain 106. As shown in FIG. 1, 4 sequences of resistance values are produced by the resistor diode chain 104. The resulting sequences of resistance values are fed to analog output pins of the security adapter J1. Security adapter J1 attaches to the game port input of a personal computer (not shown), and in a preferred embodiment security adapter J1 is a 15 pin male connector.

Turning to FIG. 2, a preferred embodiment for the security circuitry 100 is shown in greater detail. The security circuitry 100 draws power from the computer system (not shown) to which the security adapter J1 is connected on pin 1 of security adapter J1, which powers the oscillator 102 and counter chip U1. Pins 4 and 5 on security adapter J1 are ground. Most preferably, chip U1 is a MC74HC4060 chip. However, it should be understood that the security circuitry 100 may be implemented without using the MC74HC4060 chip, and any such implementation is intended to be within the scope of the present invention.

Resistors $R_1$ and $R_2$, along with capacitor $C_2$ form the frequency control circuitry for oscillator 102. That is, adjusting the values of resistors $R_1$ and $R_2$ and capacitor $C_2$ controls the output frequency of oscillator 102. In a preferred embodiment, $R_1$ is a 100K ohm resistor and $R_2$ is a 200K ohm resistor. Additionally, in a preferred embodiment $C_2$ is a 0.001 microfarad ($\mu F$) capacitor. Such an arrangement results in oscillator 102 operating at approximately 5 KHz. FIG. 2 illustrates that pins 9, 10, and 11 of the MC74HC4060 chip U1 are utilized to control the oscillator's frequency. Also as shown in FIG. 2, pin 12 is grounded for chip U1.

As illustrated in FIG. 1, the output frequency of oscillator 102 is fed to divider chain 104. Divider chain 104 divides the frequency of oscillator 102 into multiple frequency signals. Specifically, divider chain 104 divides the frequency of oscillator 102 by $2^N$. Divider chain 104 counts up based on the frequency provided to it by oscillator 102, and the output corresponding to a particular $2^N$ is changed from "high" (e.g., approximately +5 volts) to "low" (e.g., approximately 0 volts) or vice-versa based on the divider chain's count. For example, the state on output pin 7 of chip U1 is changed when divider chain 102 counts $2^4$ or 16. Likewise, the state on output pin 5 of chip U1 is changed when divider chain 102 counts to $2^5$ or 32. Therefore, pin 7 of chip U1 provides the output frequency of oscillator 102 divided by 16, and pin 5 of chip U1 provides the output frequency of oscillator 102 divided by 32.

More specifically, divider chain 104 alternates the state of pin 7 of chip U1 from "high" to "low" or vice-versa each time the divider chain 104 counts $2^4$ or 16 cycles of oscillator 102. For example, assume that pin 7 of chip U1 is in its "low" state. When divider chain 104 counts $2^4$ or 16 then the output for pin 7 of chip U1 will change to its "high" state. Likewise, when divider chain 104 counts $2^4$ or 16 again, the output for pin 7 of chip U1 will change back to its "low" state. All other output pins from the divider chain 104 operate exactly the same, only at different counting rates.

As shown in FIG. 2, in a preferred embodiment the security circuitry 100 utilizes the output from pins 1, 2, 3, 13, and 15 of chip U1, which correspond respectively to counts $2^{12}$, $2^{13}$, $2^{14}$, $2^9$, and $2^{10}$ of divider chain 104. It should be noted that the circuitry could be modified to use different counts of divider chain 104, without changing the overall spirit of the invention, and any such modification provides alternative embodiments that are intended to be within the scope of the present invention. The output frequency signals from pins 1, 2, 3, 13, and 15 of chip U1 are each fed to resistor diode chain 106. Resistor diode chain 106 converts each frequency signal to a sequence of resistance values to be fed to the security adapter's analog output pins. In a preferred embodiment, pins 3, 6, 11, and 13 of the security adapter J1 are utilized by the security circuitry 100, as illustrated in FIG. 2.

To illustrate the operation of security circuitry 100, focus is directed to pin 3 of chip U1. When pin 3 of chip U1 is low, diode $D_5$ is turned off, and the resistance presented to the game port at pin 6 of security adapter J1 is 100K via resistor $R_{11}$. When pin 3 of chip U1 is high, diode $D_5$ is turned on, and the resistance presented to the game port at pin 6 of security adapter J1 is the parallel combination of $R_{10}$ and $R_{11}$, which is approximately 8.3K.

Likewise, when pin 2 of chip U1 is low, diode $D_4$ is turned off, and the resistance presented to the game port at pin 3 of security adapter J1 is 100K via resistor $R_9$. When pin 2 of chip U1 is high, diode $D_4$ is turned on, and the resistance presented to the game port at pin 3 of security adapter J1 is the parallel combination of $R_8$ and $R_9$, which is approximately 8.3K. Further, when pin 1 of chip U1 is low, diode $D_3$ is turned off, and the resistance presented to the game port at pin 11 of security adapter J1 is 100K via resistor $R_7$. When pin 1 of chip U1 is high, diode $D_3$ is turned on, and the resistance presented to the game port at pin 11 of security adapter J1 is the parallel combination of $R_6$ and $R_7$, which is approximately 8.3K.

Focusing more specifically on pin 6 of the security adapter J1, in a preferred embodiment the output of pin 6 is presented to Joystick 0, channel Y of the game port (hereinafter "channel Y"). Pin 6 of security adapter J1 connects through resistor diode chain 106 to pin 3 of chip U1. Pin 3 of the chip U1 is the output of divider chain 104 for count $2^{14}$ (or 16,384). Accordingly, every $2^{14}$ or 16,384 cycles of oscillator 102 pin 3 of chip U1 alternates its state between "high" and "low." When pin 3 of chip U1 is in its "high" state, one value of resistance is presented to channel Y according to the resistor diode chain 106 (8.3K in a preferred embodiment), and when pin 3 changes to its "low" state 16,384 cycles later, a different resistance value is presented to channel Y according to the resistor diode chain 106 (100K in a preferred embodiment).

Pin 3 of security adapter J1 provides a resistance value to Joystick 0, channel X (hereinafter "channel X"), and pin 11 of security adapter J1 provides a resistance value to Joystick 1, channel R (hereinafter "channel R"). In a preferred embodiment, resistance values are presented to pins 3 and 11 of security adapter J1 in a manner similar to that of pin 6 of security adapter J1, only at different counting rates. Pin 3 of security adapter J1 is linked through resistor diode chain 106 to pin 2 of chip U1, which alternates between its high and low states every $2^{13}$ or 8,192 cycles of oscillator 102. When pin 2 of chip U1 is in its "high" state, one value of resistance is presented to channel X according to the resistor diode chain 106 (8.3K in a preferred embodiment), and when pin 2 changes to its "low" state 8,192 cycles later, a different resistance value is presented to channel X according to the resistor diode chain 106 (100K in a preferred embodiment). Pin 11 of security adapter J1 is linked through resistor diode chain 106 to pin 1 of chip U1, which alternates between its high and low states every $2^{12}$ or 4,096 cycles. When pin 1 of chip U1 is in its "high" state, one value of resistance is presented to channel R according to the resistor diode chain 106 (8.3K in a preferred embodiment), and when pin 1 changes to its "low" state 4,096 cycles later, a different resistance value is presented to channel R according to the resistor diode chain 106 (100K in a preferred embodiment).

Before turning to pin 13 of security adapter J1, it will be helpful to understand the relationship of the outputs presented to the game port by pins 6, 3, and 11 of the security adapter J1 (i.e., presented to channels Y, X, and R of the game port). Turning to FIGS. 3 and 4, the relationship of the outputs presented to pins 6, 3, and 11 of security adapter J1 are shown. As FIG. 3 illustrates, pins 6, 3, and 11 have 8 different states (i.e., states 0–7). For every state, each pin has either a 0 or 1, which indicates the resistance value presented to that particular channel. For example, 0 may represent 8.3K and 1 may represent 100K. Thus, there are 8 different combinations of resistance values that may be presented to pins 6, 3, and 11 of security adapter J1. As FIG. 3 further illustrates, pin 3 of security adapter J1 changes its resistance value at half the frequency of pin 11 of security adapter J1. Furthermore, pin 6 of security adapter J1 changes its resistance value at half the frequency of pin 3 of security adapter J1. In a preferred embodiment, the combination of values presented to pins 6, 3, and 11 in each state form a security code.

In a preferred embodiment, pin 11 of security adapter J1 alternates resistance values every 4,096 cycles of oscillator 102, pin 3 of security adapter J1 alternates resistance values every 8,192 cycles of oscillator 102, and pin 6 of security adapter J1 alternates resistance values every 16,384 cycles of oscillator 102. Therefore, suppose at state "0" pins 6, 3, and 11 of security adapter J1 all have resistance value 8.3K. Pin 11 of security adapter J1 alternates its resistance value to 100K in state "1," which is 4,096 cycles later. The states continue to alternate at the frequency of pin 11 (every 4,096 cycles), until every possible combination of resistance values have been presented to pins 6, 3, and 11 of security adapter J1 at state "7." Then the cycle starts over again at state This is further illustrated by FIG. 4, which shows the relationship of pins 11, 3, and 6 of security adapter J1 in waveform. In a preferred embodiment, the high states of each waveform represent approximately 100K ohm resistance and the low states of each waveform represent approximately 8.3K ohm resistance. Moreover, in a preferred embodiment oscillator 102 operates at approximately 5 KHz and pin 11 of security adapter J1 alternates between its high and low states approximately every 400 milliseconds (msec). Accordingly, in a preferred embodiment pin 3 of security adapter J1 alternates between its high and low states approximately every 800 msec., and pin 6 of security adapter J1 alternates between its high and low states approximately every 1,600 msec. Although, in alternative embodiments security circuitry 100 may be implemented to alternate the states presented to the game port at a different frequency than illustrated in FIG. 4, and any such implementation is intended to be within the scope of the present invention.

Turning back to FIG. 2 and focusing specifically on pin 13 of security adapter J1, the output of pin 13 is presented to Joystick 1, channel U(Z) of the game port (hereinafter "channel U(Z)"). Pin 13 of security adapter J1 is a combination of both pins 13 and 15 of chip U1. Pin 13 of chip U1 is the output of divider chain 104 for count $2^9$ (or 512). Accordingly, every $2^9$ or 512 cycles of oscillator 102 pin 13 of chip U1 alternates its state between "high" and "low." Pin 15 of chip U1 is the output of divider chain 104 for count $2^{10}$ (or 1,024). Accordingly, every $2^{10}$ or 1,024 cycles of oscillator 102 pin 15 of chip U1 alternates its state between "high" and "low."

Pin 13 of security adapter J1 is connected to a 100K resistor $R_4$, and then connects to two diodes ($D_1$ and $D_2$) in parallel. Pin 13 of security adapter J1 then connects to two 18K resistors ($R_3$ and $R_5$) in parallel and finally connects to pins 13 and 15 of chip U1. When pins 13 and 15 of chip U1 are both in their "high" states, one value of resistance is presented to channel U(Z) according to the resistor diode chain 106 (approximately 8.3K in a preferred embodiment). When pins 13 and 15 of chip U1 are both in their "low" states, a second resistance value is presented to channel U(Z) according to the resistor diode chain 106 (approximately 100K in a preferred embodiment). Furthermore, when pin 13 of chip U1 is "high" and pin 15 of chip U1 is "low," yet a third resistance value is presented to channel U(Z) of the game port (approximately 15K in a preferred embodiment). Likewise, when pin 13 of chip U1 is "low" and pin 15 of chip U1 is "high," the third resistance value is again presented to channel U(Z) of the game port (approximately 15K in a preferred embodiment).

Turning to FIG. 5, the resistance value presented to channel U(Z) is shown in relationship to the output states of pins 13 and 15 of chip U1. As FIG. 5 illustrates, in a preferred embodiment pins 13 and 15 of chip U1 are both "low" for 512 cycles, which causes channel U(Z) to be presented approximately 100K for 512 cycles. Pins 13 and 15 of chip U1 are then in opposite states for the following 1,024 cycles, during which channel U(Z) is presented approximately 15K. Thereafter, pins 13 and 15 of chip U1 are both "high" for 512 cycles, during which channel U(Z) is presented approximately 8.3K. This sequence of resistance values being presented to channel U(Z) of the game port may be continually repeated.

Having channel U(Z) being presented with 3 different resistance values based on the outputs of two pins (13 and 15) of chip U1 creates a confounding signal, which makes the security circuitry 100 more difficult to decode. As a result, it is more difficult for persons trying to "break" the code of security circuitry 100 to duplicate or bypass security circuitry 100. It should be noted that this type of combination of pins could be implemented by combining any number of outputs from chip U1 and by combining different outputs than shown in FIG. 5 without changing the spirit of the invention. Furthermore, the confounding signal may be implemented to have any number of different states, and is not limited only to 3 different states (or resistance values). Accordingly, any such implementation is intended to be within the scope of the present invention.

Turning back to FIG. 2, RJ-12 connections are also illustrated, which may be included to allow a device to simultaneously utilize the digital channels of the game port while the security circuitry 100 utilizes the analog channels of the game port. As shown, RJ-12 pin 1 is unused, RJ-12 pin 2 is connected to pin 7 of security adapter J1, RJ-12 pin 3 is connected to pin 14 of security adapter J1, RJ-12 pin 4 is connected to pin 10 of security adapter J1, RJ-12 pin 5 is connected to ground, and RJ-12 pin 6 is connected to pin 2 of security adapter J1. Pins 2, 7, 10, and 14 of security adapter J1 interface to digital channels of the game port. Thus, in the preferred embodiment shown in FIG. 2 a device may utilize pins 2, 7, 10, and 15 of security adapter J1 to interact with the digital channels of the game port.

For example, a foot control used to interact with a transcription program may interface with the game port of a computer via security adapter J1. Such foot control may interact with pin 14 of security adapter J1 to perform a "Record" function, pin 10 of security adapter J1 to perform a "Rewind" function, and pin 7 of security adapter J1 to perform a "Fast Forward" function. Additionally, pin 2 of security adapter J1 may be used by such a device to interact with a digital channel of the game port. It should be understood that such a foot control may interact with the game port to perform other tape transcription functions, such as "Play." It should also be understood that the RJ-12 connections are illustrated in FIG. 2 only for exemplary purposes, and such connections are not necessary for implementing security circuitry 100. However, a device may interact with digital channels of the game port of a computer via security adapter J1 without interfering with security circuitry 100, and security circuitry 100 will not interfere with such a device's operation. Thus, in this manner a device may effectively share the game port with the security circuitry 100.

Figure 6:
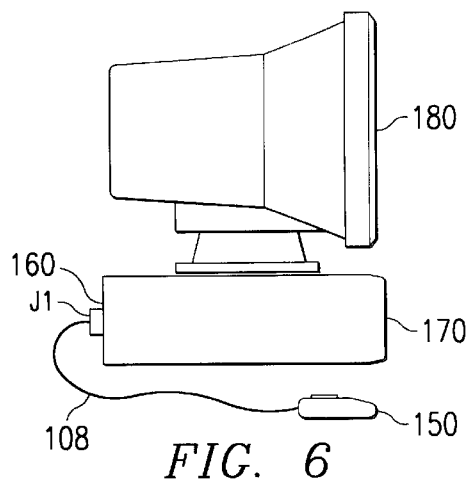
FIG. 6 shows a side view of a computer system in which the preferred embodiment may be utilized.

Directing attention to FIG. 6, an exemplary system in which the security apparatus may be implemented is shown. FIG. 6 shows a side view of a computer system 170 which includes a monitor 180 and a game port 160. Computer 170 may further include a device 150 that is connected to a security adapter J1 by a cable 108. As shown, security adapter J1 connects device 150 to the game port 160 of computer 170. Device 150 may be a device used to interact with a software program loaded on computer 170. For example, device 150 may be a foot control, or some other device used to interact with a software program via the game port 160. It should be understood that such a device 150 is not necessary for the operation of the security circuitry 100, and the security circuitry 100 may be utilized to provide security for an application program without requiring that such a device be included. The scope of the present invention is not limited only to systems that include a device 150 and is intended to encompass systems that do not include such a device.

One benefit of utilizing the security circuitry 100 within a security adapter J1 that is used to connect a device for interacting with an application program is that the security circuitry 100 may be unknown to a user. For example, device 150 may be a foot control used to interact with a transcription program on computer 170. Security adapter J1 may be required to allow foot control 150 to interface with the game port 160. Security circuitry 100 may be included within security adapter J1, such that security adapter J1 can provide security for the transcription application program. Thus, to a user it may appear that security adapter J1 is merely used for connecting device 150 to the game port 160, and the user may not know that security for an application program is being provided by security circuitry within security adapter J1.

Figure 7:
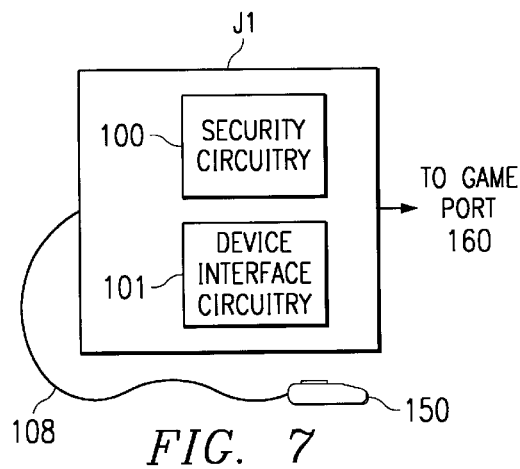
FIG. 7 shows a block diagram of a device connected to a security adapter wherein the security adapter contains the security circuitry and device interface circuitry.

Turning now to FIG. 7, a block diagram of a preferred embodiment is shown. Device 150 is connected by a cable 108 to security adapter J1. Security adapter J1 may include two sections: security circuitry 100 and device interface circuitry 101. Continuing with the above-example of a transcription program that utilizes device 150 in the form of a foot control, device interface circuitry 101 may be interface circuitry for such a foot control device 150. That is, foot control interface circuitry 101 may be utilized by the foot control 150 to interface with the game port 160 in order to perform such functions as "Record," "Rewind," and "Fast Forward." In addition, security circuitry 100 contained within the security adapter J1 may interact with the game port 160 to provide software security for the transcription program.

Figure 8:
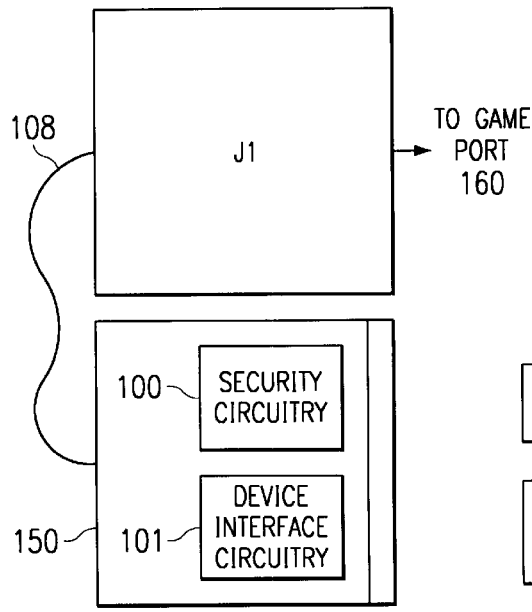
FIG. 8 shows a block diagram of a device connected to a security adapter, wherein device contains the security circuitry and device interface circuitry.

Turning to FIG. 8, an alternative embodiment is illustrated in a block diagram. FIG. 8 shows device 150, which may contain two sections: security circuitry 100 and device interface circuitry 101. Again, device 150 is connected to security adapter J1 by a cable 108, and security adapter J1 may connect to the game port 160 of the computer 170 (not shown in FIG. 8). Continuing with the above-example of a transcription program, in this alternative embodiment device 150 may again be a foot control, and device interface circuitry 101 may be interface circuitry such a foot control device 150. That is, foot control interface circuitry 101 may be utilized by the foot control 150 to interface with the game port 160 in order to perform such functions as "Record," "Rewind," and "Fast Forward." In addition, security circuitry 100 contained within the foot control device 150 may interact with the game port 160 to provide software security for the transcription program. It should also be realized that either one of the security circuitry 100 and device interface circuitry 101 may be contained within the security adapter J1, and the other one contained within the device 150, and any such implementation is intended to be within the scope of the present invention.

As still further alternatives, the security circuitry may be implemented within an interface card that may be installed in a computer or as a separate device (e.g., dongle) that connects to the game port of a computer. Various other implementations may be utilized to incorporate the security circuitry into a computer to provide security for an application program executing on such a computer, and any such implementation now known or later discovered is intended to be within the scope of the present invention. Moreover, the game port itself may be a custom card installed in a computer, which has a game port interface. Alternatively, the game port may be a multi-purpose input/output (I/O) card installed in a computer, which includes a game port interface. As still a further alternative, the game port may be a port on the motherboard of a computer, which has a game port interface. Any other implementation of a game port interface with a computer now known or later developed is intended to be within the scope of the present invention.

To provide security for an application program, security software executes to monitor the analog data signals on the input port of the computer on which the application program is attempting to be executed. In a preferred embodiment, security software executes to monitor resistance values on the game port of such computer. The security software "knows" the sequence of resistance levels (i.e., the "code sequence") that the security circuitry 100 presents to the game port, and the security software only enables the application program if the expected code sequence is found on the game port. Until the application program is enabled, it may be disabled such that the application program is not allowed to operate correctly. A developer may choose from a variety of options available as to how an application program is to proceed when it is disabled. For example, when an application program is disabled the application program may not be allowed to operate or execute at all, only a portion of the application program may be allowed to operate (i.e., the application program may have limited functionality), or the application program may be allowed to execute only in a demo mode. Any such option for proceeding when an application program is disabled is intended to be encompassed by the scope of the present invention.

Because different game ports produce different readings for identical resistance values under the same operating conditions, and changes in code states (e.g., from 4 to 5) may occur during the sampling period, the security software may condition itself to recognize a valid "high" and a valid "low" resistance level on the particular computer that is being utilized. As a result, the security software may reject the unusable readings that occur during changes in the code state. For the security program to reliably detect a "high" and "low" resistance signal on the game port, the security program may initially sample the resistance values to recognize a valid high and low. That is, the security program may condition itself to recognize valid "high" and valid "low" resistance levels on the game port. The security program may utilize the computer's sound card to read the resistance values on the game port. Preferably, such sampling may be performed during installation of the software application program to be protected. However, as discussed in more detail hereafter, such sampling may also be performed at other times, such as during the protected application program's runtime.

Figure 9:
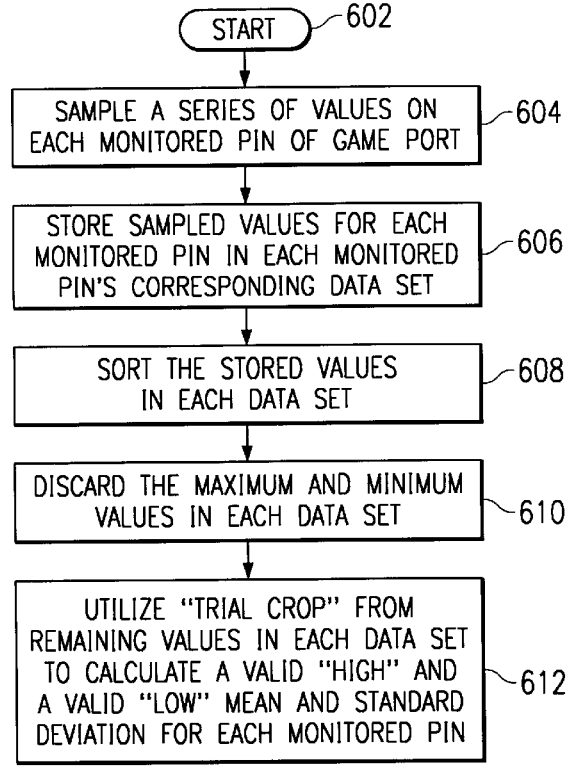
FIG. 9 shows an exemplary flow diagram for initializing a security software program to recognize a valid "high" and a valid "low" resistance level on the game port for a preferred embodiment.

Turning to FIG. 9, an exemplary flow diagram for a preferred embodiment of conditioning the security software to recognize a valid "high" and "low" resistance level on the game port is shown. The flow diagram starts at block 602. The security program samples a series of values on each pin of the game port that the security software is to monitor at block 604. In a preferred embodiment, the security samples values for channels X, Y, R, and U(Z) of the game port (i.e., pins 3, 6, 11, and 13 of security adapter J1). However, in alternative embodiments other channels may be monitored for security purposes. At block 604, the security software program reads the game port a sufficient number of times to produce a sufficiently large sampling of values presented on each monitored pin of the game port. That is, a large enough sample is taken to allow the security software to reliably recognize the values presented to the game port for a "high" resistance level and a "low" resistance level. In a preferred embodiment, the security software samples the values for each monitored channel of the game port at least 60 times, although a larger or smaller sampling may be taken in alternative embodiments.

The security program stores the sampled values for each monitored channel of the game port in a data set corresponding to each channel, represented by block 606. That is, the security program writes a data set for each monitored channel of the game port, wherein each data set contains the values sampled for the corresponding game port channel. Once the data sets containing the sampled values for each monitored game port channel are written, the security program sorts the values in each data set at block 608. For example, each data set may be sorted from its lowest sampled value to its highest sampled value, or vice-versa. Sorting the values in each data set is performed merely to allow more efficient execution by the security program of the operations that follow, and such sorting may be omitted without deviating from the scope of the present invention.

As represented by block 610, the security program next discards (e.g., removes from the data set) the maximum and minimum values in each data set. Such maximum and minimum values may actually be a range of values. For example, in a preferred embodiment the security program discards the highest 5% and lowest 5% of values in each data set. From the remaining values in each data set the security program calculates a "trial crop" or range of values used to calculate the resistance values that will be recognized as a valid "high" and the values that will be recognized as a valid "low" at block 612. In a preferred embodiment, the security program utilizes values within 10% of the lowest remaining value in each data set (i.e., the valid low "trial crop") to calculate a mean and standard deviation for a valid "low" for each monitored channel. Additionally, in a preferred embodiment the security program utilizes values within 90% of the highest remaining value in each data set (i.e., the valid high "trial crop") to calculate a mean and standard deviation for a valid "high" for each monitored channel. Preferably, this low and high "trial crop" has the effect of eliminating invalid readings that occur when code state changes occur during sampling.

Figure 10:
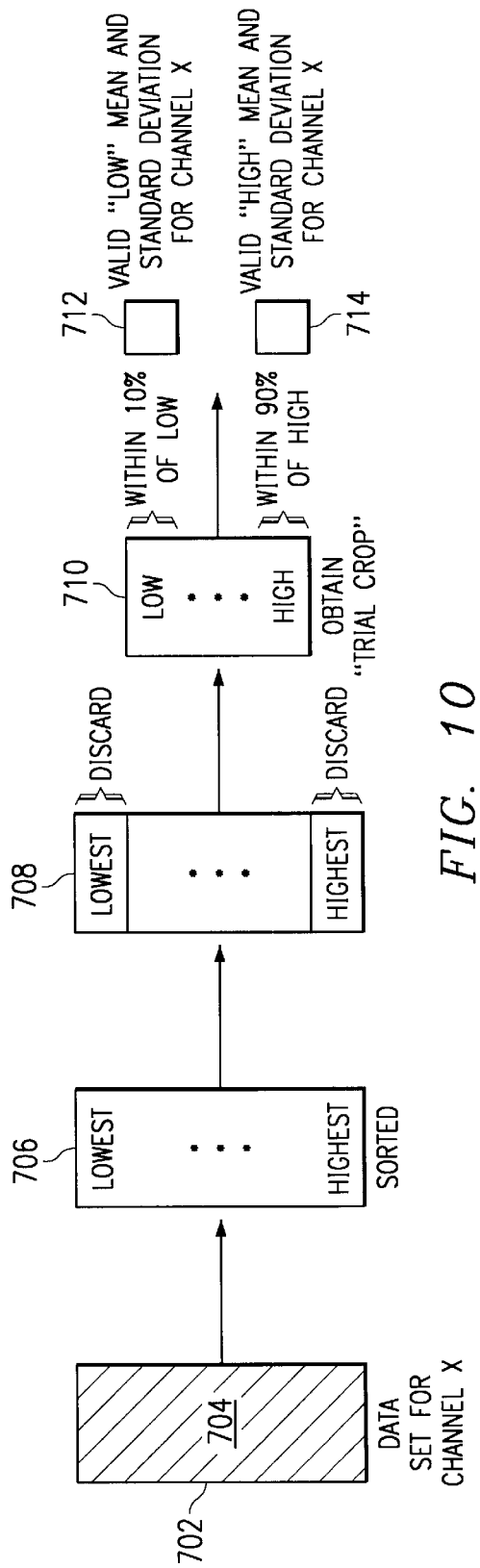
FIG. 10 shows a further exemplary flow diagram for initializing a security software program to recognize a valid "high" and a valid "low" resistance level on the game or a preferred embodiment.

A further example of a preferred embodiment for conditioning the security program to recognize a valid "high" and "low" is illustrated in FIG. 10. Turning to FIG. 10, a data set 702 for channel X of the game port is shown containing sampled values 704 from channel X. The sampled values 704 are then sorted from lowest to highest, resulting in data set 706. As explained above, sorting allows for more efficient operation by the conditioning routine, and such sorting may be omitted without deviating from the scope of the present invention. The conditioning routine next discards the very highest and lowest values within the data set for channel X, shown in data set 708. In a preferred embodiment, the lowest 5% and highest 5% of values are discarded.

From the remaining values in data set 710, the security program obtains a "trial crop" of values to use in calculating the mean and standard deviation for the valid high and low for channel X. In a preferred embodiment, the trial crop used for calculating the valid low mean and standard deviation for channel X is made up of values within 10% of the lowest remaining value. Also, in a preferred embodiment the trial crop for calculating the valid high mean and standard deviation for channel X is made up of values within 90% of the highest remaining value. Thereafter, the security program "knows" the mean and standard deviation for a valid low on channel X (shown as 712), as well as the mean and standard deviation for a valid high on channel X (shown as 714).

Data sets for other monitored channels may be manipulated in a similar fashion as shown in FIG. 10 for channel X to calculate the mean and standard deviation to be used for determining a valid high and low on such channels. When providing security for a computer application program, the security program may utilize the calculated mean and standard deviation for each monitored channel in determining whether a valid high or valid low value is detected on each channel. For example, the security program may recognize a value that is within the range of the mean +/−K standard deviations calculated for a low on channel X as being a valid low, wherein K provides the range of standard deviations from the mean. As a more specific example, the security program may recognize a value that is within the range of the mean +/−10 standard deviations calculated for a low on channel X as being a valid low. In a similar manner, the security program may recognize a value that is within the range of the mean +/−10 standard deviations calculated for a high on channel X as being a valid high. It should be understood that the value of K may be adjusted to provide a suitable range for detecting valid highs and lows on each monitored channel. More specifically, the value of K may be a value that provides the desired range for detecting valid highs and lows, and the security program may even adjust the value of K during the application program's runtime, as discussed in greater detail hereafter.

Alternatively, the security program may recognize a value that is less than the mean +K standard deviations calculated for a low on channel X as being a valid low. Similarly, the security program may recognize a value that is greater than the mean −K standard deviations calculated for a high on channel X as being a valid high. In such an implementation, the security program essentially utilizes the calculated mean for a low +K standard deviations as a "ceiling" (i.e., the highest recognized value) for a valid low, and has no "floor" for a valid low. Likewise, in this implementation the security program utilizes the calculated mean −K standard deviations for a high as a "floor" (i.e., the lowest recognized value) for a valid high, and has no "ceiling" for a valid high. In a preferred embodiment, a valid low is detected as a value that is less than the mean +6 standard deviations calculated for a low on a monitored channel, and a valid high is detected as a value that is more than the mean −6 standard deviations calculated for a high on a monitored channel.

In a preferred embodiment, the above-described sampling may be performed during installation of the application program to be protected. Additionally, in a preferred embodiment the above-described sampling may be performed periodically to continually update the mean and standard deviation to be utilized in detecting a valid "high" and "low." Thus, the security software periodically updates the mean and standard deviation utilized in detecting a valid "high" and "low" to compensate for any changes in the values presented to the game port by the security circuitry 100. The values presented to the game port may change slightly from time to time due to factors such as changes in room temperature or aging of components used in security circuitry 100. Thus, by periodically adjusting the mean and standard deviation for valid "highs" and "lows," the security program can adapt to such variations in the resistance values.

Additionally, the security program may update the range for valid highs and lows based on a history of security performed for a particular application program or particular user. For example, if the application program being protected (or the user attempting to execute the application program) has a history of security violations detected by the security program (e.g., the expected code sequence is not found on the game port), the security program may suspect tampering and adjust the range of valid highs and lows accordingly. By the same token, if the application program (or the user attempting to execute the application program) has a history of relatively few or no security violations detected by the security program, the security program may be more "trusting" and may, to a certain extent, allow a broader range of valid highs and lows. In this way, the security program may perform a type of "credit check" for a particular application or user, and the security program may adjust its monitoring of an application based on a particular application's (or a particular user's) history. Thus, as the security program detects security violations the security program may become more suspicious of tampering and adjust the values recognized as valid highs and lows in an attempt to be more certain that a true high or low value is being detected.

Figure 11:
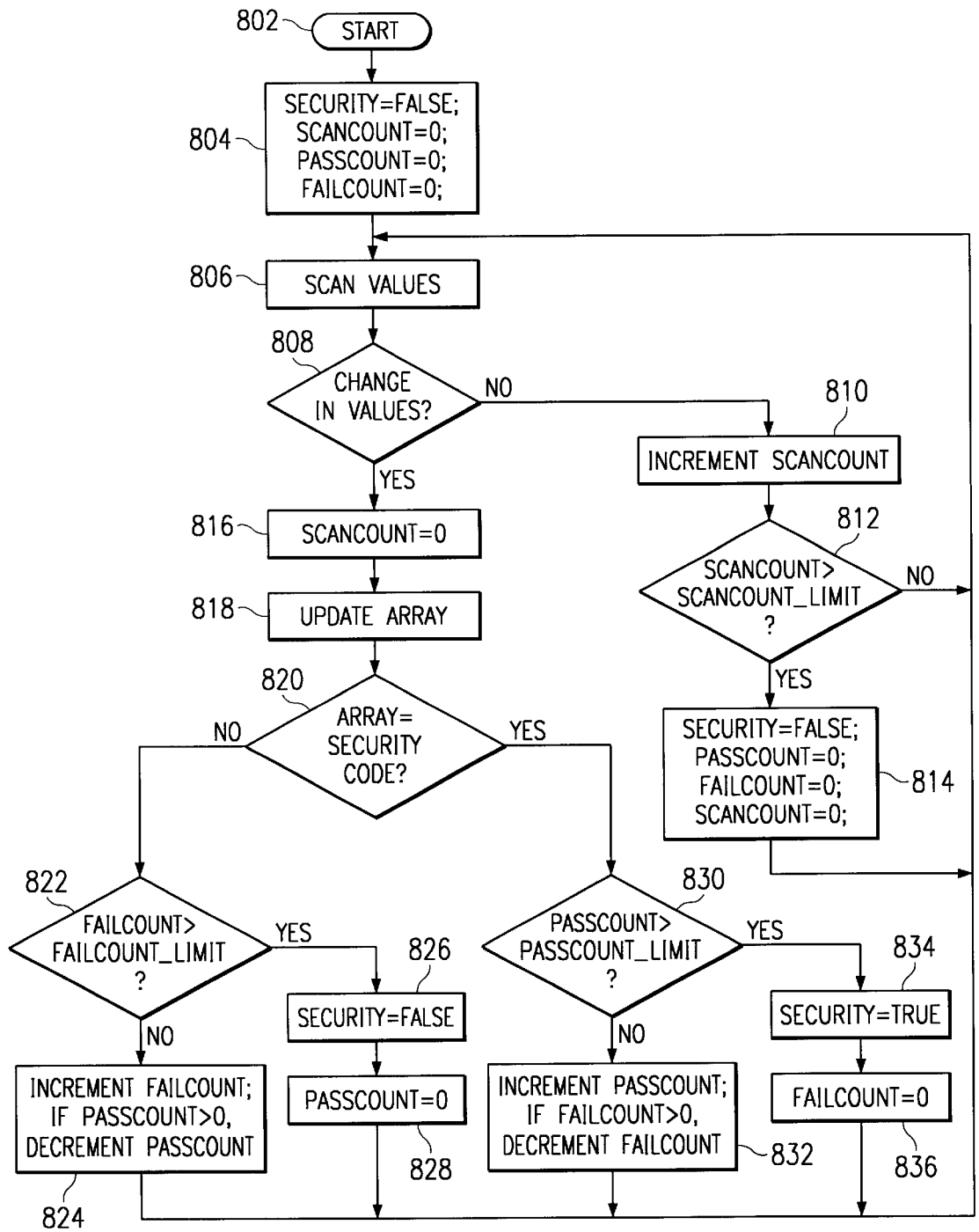
FIG. 11 shows an exemplary flow diagram for a security program executing to monitor the port and provide security for an application program in a preferred embodiment.

Once the security program is conditioned to recognize valid highs and lows on the game port, the security program may monitor the game port to provide security for an application program. Turning to FIG. 11, a flow diagram for a preferred embodiment of the security software program is shown. The flow diagram starts at block 802. Variables used within the security program may be initialized at block 804. The variable "SECURITY" is set to false indicating that the application program is to be disabled. That is, when SECURITY is false the application program may not be allowed to operate correctly, and when SECURITY is true the application program may be enabled and allowed to operate correctly. As discussed above, an application program that is disabled may not function at all, may have only limited functionality, may be presented in a demo mode, or may have some other variation to the application's normal operation.

The variables "SCANCOUNT," "PASSCOUNT," and "FAILCOUNT" are initially set to 0. As the flow diagram illustrates, SCANCOUNT represents the number of times that the exact same code sequence has been scanned. That is, SCANCOUNT represents the number of times that the game port has been scanned without detecting a change in the code sequence on the game port. PASSCOUNT represents the number of times that the scanned code sequence on the game port is as expected by the security software. FAILCOUNT represents the number of times that the scanned code sequence on the game port is not as expected by the security software.

As will become clearer with further discussion of the exemplary flow diagram of FIG. 11, the security software may utilize the SCANCOUNT, PASSCOUNT, and FAILCOUNT variables to compensate for execution delays caused by a non-real-time operating system, such as Microsoft Windows 95, 98, NT, or 2000. In a preferred embodiment, the security software monitors the game port channels independent of the security circuitry's operation (i.e., presenting code sequences to the game port). Such asynchronous operation of the security program and the security circuitry may cause problems, particularly when utilized in a non-real-time operating system.

One problem that may exist when utilized in a non-real-time operating system is that the security program's execution for scanning or reading the values on the game port may be delayed from time to time. That is, in a non-real-time operating system multitasking may be performed in a manner that delays the security program's execution for scanning or reading the values on the game port. Such multitasking may be performed in a variety of ways, including preemptive multitasking and cooperative multitasking. In preemptive multitasking, the operating system parcels out CPU time slices to each program or process being multitasked. In cooperative multitasking, each program or process can control the CPU for as long as it needs it. If a program is not using the CPU, however, it can allow another program to use it temporarily. Generally, OS/2, Windows 95, Windows NT, the Amiga operating system and UNIX use preemptive multitasking, whereas Microsoft Windows 3.x and the MultiFinder (for Macintosh computers) use cooperative multitasking.

As discussed above, a non-real-time operating system may cause delays in the security program's execution for scanning or reading values on the game port. However, the security circuitry's generation of code sequences is not delayed. Thus, when the security program actually scans the game port for a particular code sequence, the security circuitry may have already advanced to a different code sequence. Accordingly, the security program may determine that an incorrect code sequence has been detected on the game port, unless the security program compensates for this problem. The exemplary flow diagram presented in FIG. 11 anticipates such a problem and utilizes the SCANCOUNT, PASSCOUNT, and FAILCOUNT variables to compensate for this problem in a non-real-time operating system.

Another problem may exist as a result of the security circuitry and security program operating asynchronously, the security program being utilized in a non-real-time operating system, and analog pins of the game port being utilized. The security program may scan or read the values on the game port as one or more of the codes presented by the security circuitry are changing from one state to another. That is, the security program may scan the game port as one or more of the codes presented by the security circuitry are in an "in between" state (i.e., are neither a valid "high" nor a valid "low"). Accordingly, the security program may determine that an incorrect code sequence has been detected on the game port, unless the security program compensates for this problem. The exemplary flow diagram presented in FIG. 11 anticipates such a problem and utilizes the SCANCOUNT variable to compensate for this problem.

Figure 12:
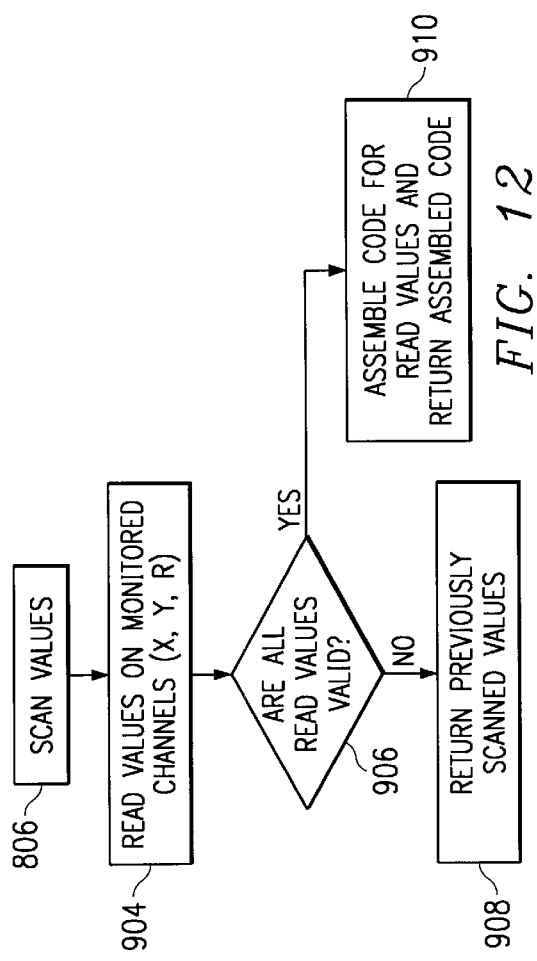
FIG. 12 shows an exemplary flow diagram for a routine of the security program for scanning values present on the game port in a preferred embodiment.

At block 806 the security program scans or reads the values on the game port channels being monitored. A flow diagram for a preferred embodiment for performing such a scan is shown in FIG. 12. As shown in FIG. 12, the "SCAN VALUES" routine is entered at block 806. The security program reads the values on the game port for the channels being monitored by the security program at block 904. In a preferred embodiment, the security program monitors channel R (Joystick 1, pin 11), channel X (Joystick 0, pin 3) and channel Y (Joystick 0, pin 6). As discussed above, in a preferred embodiment a confounding signal may be presented by the security circuitry to channel U(Z) of the game port. The security program may monitor such a confounding signal, or it may only monitor the remaining channels of the game port to provide security. In a preferred embodiment, only the remaining channels are monitored.

It should be understood that in a preferred embodiment the analog channels, rather than digital channels, are used to receive sequences of resistance values from the security circuitry. Such analog signals typically do not change from one value to another value instantaneously. Thus, the security program may scan the values of the monitored game port channels during the time period that one or more of the resistance values generated by the security circuitry are in the process of changing states. For example, in a preferred embodiment, the resistance values presented to the monitored channels of the game port alternate between 8.3K ohm and 100K ohm. If the security program scanned the monitored channels as one or more of the resistance levels are changing states, the software program may read values between 8.3K ohm and 100K ohm. Accordingly, scanning the game port as one or more of the resistance levels are changing states may result in a false detection of security failure (i.e., neither a valid high nor a valid low).

To avoid such a false detection, the security program may determine whether all of the read values are within a valid range at block 906. That is, the security program may determine whether the values are each within the range for either a valid high or a valid low as previously discussed. For example, in determining whether a scanned value is a valid low or valid high, the security program may determine whether the scanned value is less than the mean +K standard deviations calculated for a low on a monitored channel (representing a valid low) or whether the scanned value is greater than the mean −6 standard deviations calculated for a high on a monitored channel (representing a valid high). Other methods for determining whether a value is a valid high or a valid low have been discussed previously, and any such method is intended to be within the scope of the present invention.

If the security program determines at block 906 that all of the values read are not valid, the security program returns the previously read (or "scanned") values at step 908. Thus, if all of the values read are not valid, the security program ignores the read values and reuses the previously read values. Therefore, if the security program scans the game port channels as one or more of the resistance levels are in an "in between" state, the security program may ignore such values and repeat the previously read values.

If at block 906 the security program determines that all of the values read are valid, the security program assembles and returns the code for the read values at block 910. For example, in a preferred embodiment channels X, Y, and R of the game port are monitored. As shown in FIG. 3, there are 8 different states for such a preferred embodiment, thus forming a code sequence having 8 different states (or "codes"). In such a preferred embodiment, the assembled code of block 810 may be a number from 0 to 7, which represents the state of the game port channels read by the security program. Suppose channels X, Y, and R are all "low," such a state may be represented by a code "0." Likewise, if channels X, Y, and R are all "high," such a state may be represented by a code "7." As illustrated in FIG. 3, each state may be likewise represented by a number corresponding with the state of the monitored channels. In other words, the binary representation of the monitored channels may be converted to the corresponding integer number as a code for the particular state read.

Turning back now to FIG. 11, after the security program scans the values on the game port channels, it determines whether the scanned values are different than the previous scan at block 808. That is, the security program determines whether the values have changed since the previous scan. For increased reliability, the security program preferably scans the monitored game port channels at least twice during each state presented to the game port (e.g., during each code of the code sequence). Referring back to FIGS. 3 and 4, in a preferred embodiment there are 8 different states. Moreover, in a preferred embodiment, the states advance at a frequency of 400 msec. per state. Using that rate, the security program preferably scans the game port channels at least once every 200 msec. For further reliability, the security program may scan the game port channels more often, such as once every 100 msec. It should be understood that the rate of scanning the game port channels reliably is dependent on the rate at which the states presented to the game port alternate. Accordingly, if the states alternate at a frequency other than 400 msec. per state, the security program may likewise scan the game port at a different rate.

Because the software program preferably scans the game port channels at a faster rate than the rate at which the states presented to the game port change, the software may scan the exact same state on the game port several consecutive times. Scanning the exact same state several consecutive times may indicate normal operation of the security circuitry, assuming that the software program is scanning the states presented to the game port at a rate faster than the states change. However, scanning the exact same state too many consecutive times may indicate a security problem. For example, if the security circuitry 100 is disconnected from the game port leaving the game port with no device coupled to it, the values on the game port channels will not change. The security program utilizes the variable SCAN-COUNT to determine the point at which repeatedly scanning the exact same state indicates a security problem.

As shown in FIG. 11, if there is not a change in the scanned values SCANCOUNT is incremented at block 810. At block 812, the security program makes a determination whether SCANCOUNT is greater than the variable SCANCOUNT_LIMIT. SCANCOUNT_LIMIT contains the number at which it can be determined that there is a problem with security due to repeatedly scanning the same state. SCANCOUNT_LIMIT may be set at 10, 15, 100, or some other appropriate value depending on the rate at which the security program is scanning the game port and the rate at which the states on the game port are expected to change. If it is determined at block 812 that SCANCOUNT is greater than the SCANCOUNT_LIMIT, the security program sets SECURITY to false (disabling the application program) and variables PASSCOUNT, FAILCOUNT, and SCANCOUNT are reset to 0. Thereafter, the program's operation loops back to block 806.

Figure 13:
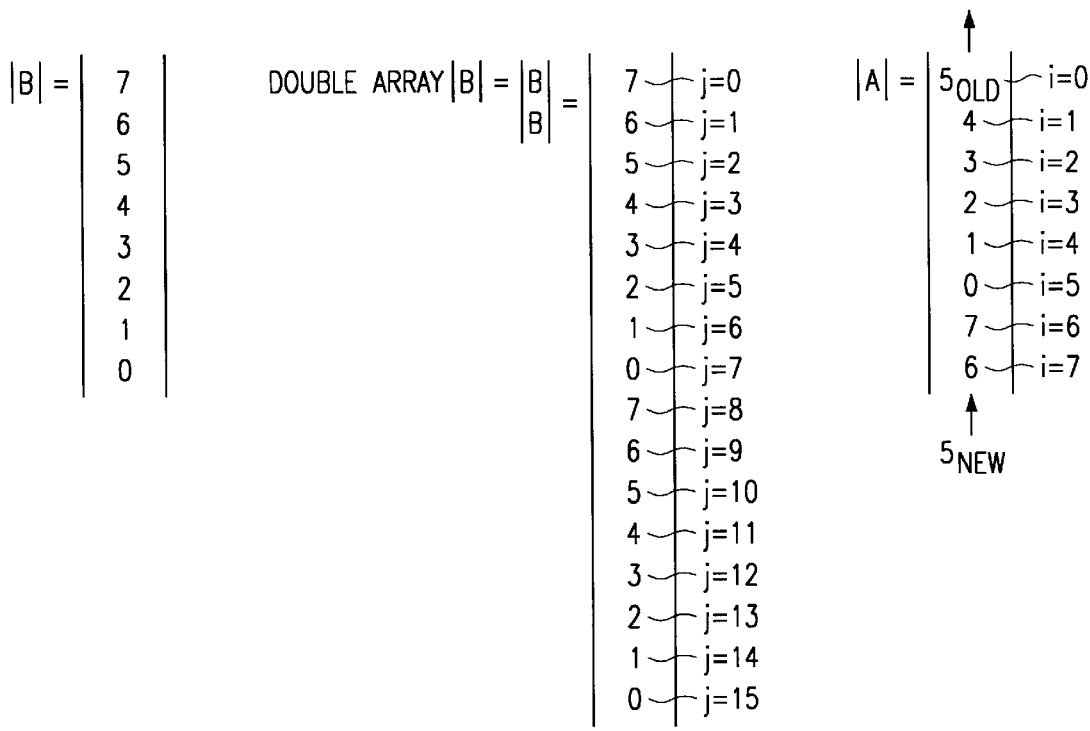
FIG. 13 shows exemplary arrays utilized by the security program in a preferred embodiment to compare values present on the game port with an expected code sequence in a preferred embodiment.

If the security program determines at step 808 that the values presented to the game port have changed since the previous scan, the SCANCOUNT variable is reset to 0 at block 816. The array of values previously scanned from the game port is updated with the new value at block 818. The operation of such array is further explained in conjunction with FIG. 13. Turning to FIG. 13, Array B contains the expected code sequence to be read by the security program on the game port. As shown in FIG. 13, the expected code sequence may be "7, 6, 5, 4, 3, 2, 1, 0." Thus, the security program expects to read the code "7" when first scanning the game port, code "6" the next scan, and so on. As previously discussed, the exact same code sequence may be consecutively scanned by the security program, and the security program takes into account for such double-scanning with its utilization of variable "SCANCOUNT." It should be understood that the code sequence presented herein is solely for exemplary purposes and a different code sequence may be implemented in the security circuitry and security program. It should be further understood that the code sequence need not be a consecutive sequence of numbers, and may be a non-consecutive sequence, such as "0, 5, 4, 1, 7, 2, 6, 3." Any such implementation of a code sequence is intended to be within the scope of the present invention.

As shown in FIG. 13, in a preferred embodiment the expected code sequence of Array B is placed in a "Double Array B," which contains the expected code sequence followed by a repeat of the expected code sequence. In a preferred embodiment, Double Array B is stored in the computer's memory and used by the security program to determine whether the expected code sequences are being presented to the game port. Array A contains the actual codes presented to the game port. That is, as the security program scans codes from the game port it stores the scanned codes in Array A. In a preferred embodiment, Array A contains the number of elements equal to the number of possible states presented to the game port. As shown in FIG. 3, in a preferred embodiment 8 states are presented to the game port, thus Array A contains 8 elements (or codes) in such a preferred embodiment (i.e., codes i=0 through i=7).

When the security program scans a new code on the game port, it updates Array A with the new value (block 818 in FIG. 11). An example of updating is illustrated in FIG. 13, wherein the security program scans new code $5_{NEW}$ on the game port. Code $5_{OLD}$, which is element i=0 in Array A, is discarded from Array A. The remaining codes (i=1 through i=7) shift up one position (e.g., code i=1 shifts to i=0, etc.), and the new code $5_{NEW}$ is inserted into Array A at the last position (i.e., code i=7). It should be understood that various methods may be used for updating Array A, including utilizing a first in, first out method (FIFO) or utilizing a circular buffer with overflow. It should be understood that in alternative embodiments any method now known or later developed for maintaining and updating an array may be utilized, and any such embodiment is intended to be within the scope of the present invention.

Figure 14:
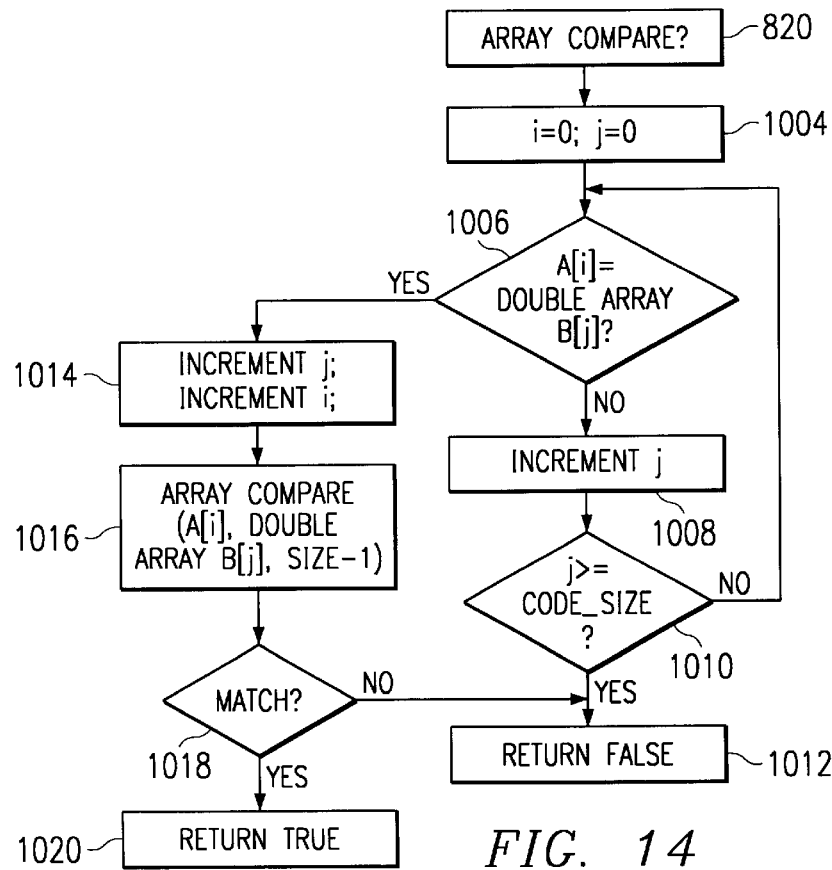
FIG. 14 shows an exemplary flow diagram for a routine of the security program for comparing the values present on the game port with an expected code sequence in a preferred embodiment.

At block 820, the security program determines whether the array of scanned values (e.g., Array A) is equal to the expected security code (e.g., Array B). A preferred embodiment for the security program's execution in making such a determination is illustrated by the "ARRAY COMPARE" routine shown in flow diagram form in FIG. 14. Turning to FIG. 14, the ARRAY COMPARE routine is entered at block 820. Variables i and j are set to 0 at block 1004. At block 1006, the security program compares the first element of Array A with the first element of Double Array B. That is code i=0 of Array A is compared to code j=0 of Double Array B. If the codes do not match, the security program increments variable j at block 1008. Thereafter, the security program determines whether j is greater than or equal to variable CODE_SIZE, which represents the number of states in a code sequence. Thus, in a preferred embodiment there are 8 states in the code sequence (shown in FIG. 3), and variable CODE_SIZE is set to 8. If the security program determines at block 1010 that variable j is greater than or equal to CODE_SIZE, routine ARRAY COMPARE returns a false at block 1012.

If the security program determines at block 1010 that variable j is less than CODE_SIZE, the program's operation loops back to block 1006 and compares the next (incremented) element of Double Array B to the first element of Array A. If at block 1006 the security program determines that the compared codes of Double Array B and Array A match, the security program advances to block 1014. At block 1014, both variables i and j are incremented. Thereafter, the remaining codes of Array A are compared with the next succeeding codes of Double Array B at block 1016. At block 1018, the security program determines whether the remaining codes of Array A and the next succeeding codes of Double Array B match. If the codes do not match, routine ARRAY COMPARE returns a false at block 1012. If the codes do match, routine ARRAY COMPARE returns a true at block 1020.

An example of the execution of routine ARRAY COMPARE can be seen in FIG. 13. The routine first sets variables i and j to 0 at block 1004. The routine then compares code i=0 of Array A with code j=0 of Double Array B. Assuming that code $5_{NEW}$ has not yet been scanned into Array A, code $5_{OLD}$ of Array A is compared with code 7 of Double Array B. The codes do not match, so the routine increments j to value 1 at block 1008. In the embodiment illustrated in FIG. 13, there are 8 states (or 8 different codes) in the code sequence. Accordingly, variable CODE_SIZE is set to 8. Thus, at block 1010 the routine determines that j is less than CODE_SIZE (i.e., 1 is less than 8). So, the routine's execution loops back to block 1006, and the routine compares code i=0 of Array A with code j=1 of Double Array B. Therefore, Code $5_{OLD}$ of Array A is compared with code 6 of Double Array B.

Again, the codes do not match, so the routine increments variable j to 2 at block 1008. At block 1010, the routine determines that j is less than CODE_SIZE (i.e., 2 is less than 8). Therefore, the routine's execution loops back to block 1006, and the routine compares code i=0 of Array A with code j=2 of Double Array B. Accordingly, code $5_{OLD}$ of Array A is compared with code 5 of Double Array B. The routine determines that the codes match and advances its execution to block 1014 where variable j is incremented to 3 and variable i is incremented to 1. At block 1016, the routine compares the remaining codes of Array A (codes i=1 through i=7) with the next succeeding codes in Double Array B (codes j=3 through j=9). At block 1018, the routine determines that such codes match, and the routine returns a true at block 1020.

Turning back to FIG. 11, if it is determined that the array of scanned values (Array A) is not equal to the security code (i.e., routine ARRAY COMPARE returned a false), the security program determines whether FAILCOUNT exceeds the FAILCOUNT_LIMIT at block 822. If FAILCOUNT does not exceed FAILCOUNT_LIMIT, the FAILCOUNT variable is incremented and the PASSCOUNT variable is decremented (if PASSCOUNT is not already 0) at block 824. Therefore, the FAILCOUNT variable contains the number of times that the scanned values on the game port do not match the security code. Moreover, the PASSCOUNT variable is decremented each time that the scanned values on the game port do not match the security code, but PASSCOUNT does not decrement below 0. After block 824 the program's execution loops back to block 806 and continues to scan for the matching security code.

If the security program determines at block 822 that FAILCOUNT exceeds the FAILCOUNT_LIMIT, the variable SECURITY is set to false causing the application program to be disabled at block 826. The PASSCOUNT variable is set to 0 at block 828, which may be a redundant step considering that the PASSCOUNT variable decrements each time that the FAILCOUNT variable increments. That is, PASSCOUNT may very well already have a value of 0. After executing blocks 826 and 828, the security program's execution loops back to block 806 and continues to scan the game port for the matching security code.

If at block 820 the security program determines that the array of scanned values (Array A) matches the security code (i.e., routine ARRAY COMPARE returned a true), the security program determines whether the variable PASSCOUNT exceeds the variable PASSCOUNT_LIMIT at block 830. That is, the security program determines whether matching values have been scanned on the game port a sufficient number of times to enable the protected application program. For example, PASSCOUNT_LIMIT may be set at 19, wherein the protected application program will not be enabled until the PASSCOUNT variable first reaches 20. If the security program determines at block 830 that the PASSCOUNT variable does not exceed the PASSCOUNT_

LIMIT variable, the PASSCOUNT variable is incremented and the FAILCOUNT variable is decremented (if FAILCOUNT is not already 0) at block 832. Therefore, the PASSCOUNT variable contains the number of times that the scanned values on the game port match the security code up to the value PASSCOUNT_LIMIT. Moreover, the FAILCOUNT variable is decremented each time that the scanned values on the game port match the security code, but FAILCOUNT does not decrement below 0. After block 832, the program's execution loops back to block 806 and continues to scan for the matching security code.

If at block 830 the security program determines that PASSCOUNT exceeds PASSCOUNT_LIMIT, the SECURITY variable is set to true causing the protected application program to be enabled at block 834. The FAILCOUNT variable is set to 0 at block 836, which may be a redundant step considering that the FAILCOUNT variable decrements each time that the PASSCOUNT variable increments. That is, FAILCOUNT may very well already have a value of 0. After executing block's 834 and 836, the security program's execution loops back to block 806 and continues to scan the game port for the matching security code.

Thus, it can be seen that if a user attempts to run the protected application program, the application program is not enabled until the security program determines that PASSCOUNT is greater than PASSCOUNT_LIMIT (causing SECURITY to be true). That is, the application program is not enabled until a sufficient number of passing states are scanned on the game port. Once the application program is enabled, it remains enabled until the FAILCOUNT variable exceeds the FAILCOUNT_LIMIT variable or the SCANCOUNT variable exceeds the SCANCOUNT_LIMIT variable. That is, the protected application program remains enabled until the scanned values on the game port fail to match the security code an excessive number of times, or the scanned values fail to change from one state (or code) to a different state (or code) after an excessive number of scans. Accordingly, if at any time during the application program's operation an excessive number of failing states are scanned on the game port, the application program is disabled (i.e., the FAILCOUNT variable exceeds FAILCOUNT_LIMIT causing SECURITY to be false). Also, if at any time during the protected application program's operation a state is repeatedly scanned on the game port an excessive number of times, the application program is disabled (i.e., the SCANCOUNT variable exceeds SCANCOUNT_LIMIT causing SECURITY to be false).

Because the security program and security circuitry operate independently of one another and the security program may be executing in a non-real-time operating system, the code sequence expected by the security program may not coincide with the code sequence presented to the game port by the security circuitry. As described above, the variables SCANCOUNT, PASSCOUNT, and FAILCOUNT may be utilized in a preferred embodiment to compensate for such an unexpected code sequence. That is, the security program may utilize variables SCANCOUNT, PASSCOUNT, and FAILCOUNT to track the number of times that an unexpected code sequence is scanned, and only if an unexpected code sequence is detected an unacceptable number of times is the application program disabled. Accordingly, the security program may anticipate that the code sequences generated by the security circuitry and the code sequences expected by the security program may get out of synch, and the security program may compensate for such a situation by disabling the application program only after the security codes have had a sufficient opportunity to get back in synch.

In an alternative embodiment, the security circuitry may generate a new code sequence to the game port only upon being triggered by the security program reading or scanning the game port. That is, the security circuitry may detect when the security program reads or scans the game port, and once the security circuitry detects such a read or scan the security circuitry may generate and present the next code to the game port. Accordingly, the code sequence expected by the security program and the code sequence generated by the security program may remain in synch, even in a non-real-time operating system. That is, the security circuitry and the security program will each advance to the next successive code in the security code sequence at the same time.

It should be understood that the code sequences presented herein have been presented solely for exemplary purposes. Furthermore, the frequency rates at which the code sequences change from one state to another state have been presented herein solely for exemplary purposes. Accordingly, different code sequences may be utilized, which change from one state to another at a different frequency rate than presented herein, and any such embodiment is intended to be within the scope of the present invention.

It should also be understood that in alternative embodiments, analog data signals other than resistance values may be utilized. That is, analog data signals other than resistance values may be generated by the security circuitry and input to an analog input port of a computer. Also, data signals other than resistance values may be monitored by the security software to provide security for an application program. It should also be understood that in alternative embodiments, analog input ports other than the game port may be utilized for inputting such analog data signals.

Even though it has been explained herein in conjunction with software security, the disclosed software code and method may have other applications as well. The disclosed software code and method may be utilized for various applications in which analog input data may be read and compared with expected data. Any such application is intended to be within the scope of the present invention, and the application of the disclosed software code and method is not intended to be limited only to providing security for an application program.

Moreover, even though the preferred embodiment for the security circuitry for generating a security code and the preferred embodiment for security software for providing security for an application program have been discussed in conjunction with each other herein, neither is intended to be limited to being used solely in conjunction with the other. That is, the present invention is intended to encompass utilizing such security software for providing security for an application program in conjunction with different security circuitry.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing security for a software program executing on a computer, the method comprising:

periodically scanning analog data from a predetermined input port of said computer, wherein said analog data represents a scanned security code;

determining if said scanned security code corresponds with an expected security code; and enabling said software program to operate correctly only if said scanned security code corresponds with said expected security code.

2. The method of claim 1, wherein said predetermined input port of said computer is a game port, and wherein said analog data is resistance value.

3. The method of claim 2, wherein said periodically scanning further comprises:

periodically scanning a resistance value from one or more predetermined channels of said game port.

4. The method of claim 3, further comprising:

determining if each resistance value scanned from said one or more predetermined channels is valid.

5. The method of claim 4, further comprising:

determining one or more ranges of resistance values; and determining if each scanned resistance value is within said one or more ranges of resistance values, wherein only if each scanned resistance value is within said one or more ranges of resistance values is each scanned resistance value valid.

6. The method of claim 4, further comprising:

determining a range of resistance values for a valid high resistance value; and determining a range of resistance values for a valid low resistance value.

7. The method of claim 6, further comprising:

sampling a set of resistance values on each of said one or more predetermined channels of said game port;

storing each sampled set of resistance values as a data set for each of said one or more predetermined channels;

determining a trial crop of resistance values for each data set;

calculating a first mean and first standard deviation for a valid high resistance value from each trial crop; and calculating a second mean and second standard deviation for a valid low resistance value from each trial crop.

8. The method of claim 7, further comprising:

utilizing said calculated first mean and first standard deviation to determine said range of resistance values for a valid high resistance value for each of said one or more predetermined channels; and utilizing said calculated second mean and second standard deviation to determine said range of resistance values for a valid low resistance value for each of said one or more predetermined channels.

9. The method of claim 8, further comprising:

determining said range of resistance values for a valid high resistance value is said first mean +/−one or more of said first standard deviations; and determining said range of resistance values for a valid low resistance value is said second mean +/−one or more of said second standard deviations.

10. The method of claim 8, further comprising:

determining said range of resistance values for a valid high resistance value is all values greater than said first mean minus one or more of said first standard deviations; and determining said range of resistance values for a valid low resistance value is all values less than said second mean plus one or more of said second standard deviations.

11. The method of claim 7, wherein said sampling a set of resistance values on each of said one or more predetermined channels of said game port is performed during installation of said software program.

12. The method of claim 7, wherein said sampling a set of resistance values on each of said one or more predetermined channels of said game port is performed periodically during run-time of said software program.

13. The method of claim 6, wherein said range of resistance values for a valid high and said range of resistance values for a valid low are adjusted based upon a history of security performed.

14. The method of claim 13, wherein said range of resistance values for a valid high and said range of resistance values for a valid low are adjusted to comprise fewer values based upon a history of security failures.

15. The method of claim 2, wherein determining if said scanned security code corresponds with said expected security code further comprises:

storing said expected security code as a double array;

storing said scanned security code as an array; and comparing said array with said double array to determine if said scanned security code corresponds with said expected security code.

16. The method of claim 15, wherein said comparing said array with said double array further comprises:

(a) comparing the first element of said array with the first element of said double array;

(b) if said first element of said array and the first element of said double array do not match, incrementing a count of the number of comparisons made and determining if said count exceeds the number of elements required for said expected security code, wherein if said count does exceed the number of elements required for said expected security code, then determining that said array and said double array do not correspond, and wherein if said count does not exceed the number of elements required for said expected security code, then advancing to the next element of said double array and comparing said next element of said double array with the first element of said array;

(c) repeating step (b) until it is determined that an element of said double array matches the first element of said array or it is determined that said double array and said array do not correspond;

(d) if determined that an element of said double array matches the first element of said array, then comparing each successive element of said array with each successive element of said double array for the remaining number of elements required for said expected security code; and (e) determining that said double array and said array correspond if each successive element of said array and each successive element of said double array match for the remaining number of elements required for said expected security code, otherwise determining that said double array and said array do not correspond.

17. The method of claim 1, further comprising:

compensating for execution delays caused by a non-real-time operating system.

18. The method of claim 17, wherein said compensating for execution delays further comprises:

if determined that said scanned security code does not correspond with said expected security code, then determining if a fail count exceeds a fail count limit, wherein if said fail count exceeds said fail count limit, then disabling said software program, and wherein if said fail count does not exceed said fail count limit, then incrementing said fail count and decrementing a pass count if said pass count is greater than a first lower limit; and if determined that said scanned security code does correspond with said expected security code, then determining if said pass count exceeds a pass count limit, wherein if said pass count exceeds said pass count limit, then enabling said software program, and wherein if said pass count does not exceed said pass count limit, then incrementing said pass count and decrementing said fail count if said fail count is greater than a second lower limit.

19. The method of claim 18, wherein said first lower limit and said second lower limit are 0.

20. The method of claim 17, wherein said non-real-time operating system is an operating system selected from the group consisting of:

Microsoft Windows 95, Microsoft Windows 98, Microsoft Windows NT, and Microsoft Windows 2000.

21. The method of claim 1, further comprising:

compensating for said analog data being presented to said input port asynchronous to said scanning.

22. The method of claim 21, wherein said compensating further comprises:

determining if said analog data is valid;

if said analog data is not valid, then ignoring the analog data and determining if a scan count exceeds a scan count limit, wherein if said scan count exceeds said scan count limit, then disabling said application program, and wherein if said scan count does not exceed said scan count limit, then incrementing said scan count; and if said analog data is valid, then said security software program setting said scan count to a lower limit.

23. A method for compensating for execution delays present in a non-real-time operating system by a security software program executing on a computer, wherein said security software program reads real-time input data in providing security for an application program, the method comprising:

reading said input data;

determining if said input data corresponds with an expected security code;

if said input data does not correspond with said expected security code, then determining if a fail count exceeds a fail count limit, wherein if said fail count exceeds said fail count limit, then disabling said application program, and wherein if said fail count does not exceed said fail count limit, then incrementing said fail count and decrementing a pass count if said pass count is greater than a first lower limit; and if said input data does correspond with said expected security code, then determining if said pass count exceeds a pass count limit, wherein if said pass count exceeds said pass count limit, then enabling said application program, and wherein if said pass count does not exceed said pass count limit, then incrementing said pass count and decrementing said fail count if said fail count is greater than a second lower limit.

24. The method of claim 23, further comprising:

initializing said pass count to 0;

initializing said fail count to 0; and initializing said application program to be disabled.

25. The method of claim 23, wherein said first lower limit and said second lower limit are 0.

26. The method of claim 23, further comprising:

if said input data does not correspond with said expected security code and said fail count exceeds said fail count limit, then incrementing said fail count; and if said input data does correspond with said expected security code and said pass count exceeds said pass count limit, then incrementing said pass count.

27. The method of claim 23, wherein said software program performs said reading input data periodically.

28. The method of claim 23, wherein said input data is analog data.

29. The method of claim 23, wherein said input data comprises a resistance value present on at least one channel of a computer's game port.

30. The method of claim 23, wherein said input data is presented to said computer asynchronous to said security software program reading said data.

31. A method for reading asynchronous input data by a security software program executing on a computer, said security software program providing security for an application program, wherein said security software program compensates for said input data being asynchronous, the method comprising:

said security software program reading said input data;

said security software program determining if said input data is valid;

if said input data is not valid, then said security software program ignoring the input data and determining if a scan count exceeds a scan count limit, wherein if said scan count exceeds said scan count limit, then disabling said application program, and wherein if said scan count does not exceed said scan count limit, then incrementing said scan count; and if said input data is valid, then said security software program setting said scan count to a lower limit.

32. The method of claim 31, further comprising:

if said input data is not valid and said scan count. exceeds said scan count limit, incrementing said scan count.

33. The method of claim 31, wherein said lower limit is 0.

34. The method of claim 31, wherein said security software program performs said reading input data periodically.

35. The method of claim 31, wherein said input data is analog data.

36. The method of claim 31, wherein said input data comprises a resistance value present on at least one channel of said computer's game port.

37. Computer executable software code stored on a computer readable medium, the code for a security software program that provides security for an application program, the code comprising:

code for periodically scanning analog data from a predetermined input port of a computer, wherein said analog data represents a scanned security code;

code for determining if said scanned security code corresponds with an expected security code; and code for enabling said software program to operate correctly only if said scanned security code corresponds with said expected security code.

38. The computer executable software code of claim 37, wherein said predetermined input port of said computer is a game port, and wherein said analog data is resistance value.

39. The computer executable software code of claim 38, wherein said periodically scanning further comprises:

periodically scanning a resistance value from one or more predetermined channels of said game port.

40. The computer executable software code of claim 39, further comprising:

code for determining if each resistance value scanned from said one or more predetermined channels is valid.

41. The computer executable software code of claim 39, further comprising:

code for determining a range for valid resistance values; and code for determining if each scanned resistance value is within said range, wherein only if each scanned resistance value is within said range is each scanned resistance value valid.

42. The computer executable software code of claim 39, further comprising:

code for determining a range for a valid high resistance value; and code for determining a range for a valid low resistance value.

43. The computer executable software code of claim 42, further comprising:

code for sampling a set of resistance values on each of said one or more predetermined channels of said game port;

code for storing each sampled set of resistance values as a data set for each of said one or more predetermined channels;

code for determining a trial crop of resistance values for each data set;

code for calculating a first mean and first standard deviation for a valid high resistance value from each trial crop; and code for calculating a second mean and second standard deviation for a valid low resistance value from each trial crop.

44. The computer executable software code of claim 43, further comprising:

code for utilizing said calculated first mean and first standard deviation to determine said range for a valid high resistance value for each of said one or more predetermined channels; and code for utilizing said calculated second mean and second standard deviation to determine said range for a valid low resistance value for each of said one or more predetermined channels.

45. The computer executable software code of claim 44, further comprising:

code for determining said range for a valid high resistance value is said first mean +/−one or more of said first standard deviations; and code for determining said range for a valid low resistance value is said second mean +/−one or more of said second standard deviations.

46. The computer executable software code of claim 44, further comprising:

code for determining said range for a valid high resistance value is all values greater than said first mean minus one or more of said first standard deviations; and code for determining said range for a valid low resistance value is all values less than said second mean plus one or more of said second standard deviations.

47. The computer executable software code of claim 38, further comprising:

code for assembling resistance values from multiple channels of said game port into a security code.

48. The computer executable software code of claim 37, wherein said code for determining if said scanned security code corresponds with said expected security code further comprises:

code for storing said expected security code as a double array;

code for storing said scanned security code as an array; and code for comparing said array with said double array to determine if said scanned security code corresponds with said expected security code.

49. The computer executable software code of claim 48, wherein said comparing said array with said double array further comprises:

(a) comparing the first element of said array with the first element of said double array;

(b) if said first element of said array and the first element of said double array do not match, incrementing a count of the number of comparisons made and determining if said count exceeds the number of elements required for said expected security code, wherein if said count does exceed the number of elements required for said expected security code, then determining that said array and said double array do not correspond, and wherein if said count does not exceed the number of elements required for said expected security code, then advancing to the next element of said double array and comparing said next element of said double array with the first element of said array;

(c) repeating step (b) until it is determined that an element of said double array matches the first element of said array or it is determined that said double array and said array do not correspond;

(d) if determined that an element of said double array matches the first element of said array, then comparing each successive element of said array with each successive element of said double array for the remaining number of elements required for said expected security code; and (e) determining that said double array and said array correspond if each successive element of said array and each successive element of said double array match for the remaining number of elements required for said expected security code, otherwise determining that said double array and said array do not correspond.

50. The computer executable software code of claim 37, further comprising:

code for compensating for execution delays caused by a non-real-time operating system.

51. The computer executable software code of claim 50, wherein said code for compensating further comprises:

if determined by said code that said scanned security code does not correspond with said expected security code, code for determining if a fail count exceeds a fail count limit, wherein if said fail count exceeds said fail count limit, then disabling said application program, and wherein if said fail count does not exceed said fail count limit, then incrementing said fail count and decrementing a pass count if said pass count is greater than a first lower limit; and if determined that said scanned security code does correspond with said expected security code, then determining if said pass count exceeds a pass count limit, wherein if said pass count exceeds said pass count limit, then enabling said application program, and wherein if said pass count does not exceed said pass count limit, then incrementing said pass count and decrementing said fail count if said fail count is greater than a second lower limit.

52. The computer executable software code of claim 50, wherein said non-real-time operating system is an operating system selected from the group consisting of: Microsoft Windows 95, Microsoft Windows 98, Microsoft Windows NT, and Microsoft Windows 2000.

53. The computer executable software code of claim 37, further comprising:

compensating for said analog data being presented to said input port asynchronous to said scanning.

54. The computer executable software code of claim 53, wherein said compensating further comprises:

determining if said analog data is valid;

if said analog data is not valid, then ignoring the analog data and determining if a scan count exceeds a scan count limit, wherein if said scan count exceeds said scan count limit, then disabling said application program, and wherein if said scan count does not exceed said scan count limit, then incrementing said scan count; and if said analog data is valid, then setting said scan count to a lower limit.

* * * * *